(12) United States Patent
Ueda et al.

(10) Patent No.: US 8,672,073 B2
(45) Date of Patent: Mar. 18, 2014

(54) CONSTRUCTION MACHINE

(71) Applicant: Kobelco Construction Machinery Co., Ltd., Hiroshima (JP)

(72) Inventors: Kazuhiro Ueda, Hiroshima (JP); Tomoyuki Tsuchihashi, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 0 days.

(21) Appl. No.: 13/778,907

(22) Filed: Feb. 27, 2013

(65) Prior Publication Data

US 2013/0228388 A1  Sep. 5, 2013

(30) Foreign Application Priority Data

Mar. 1, 2012  (JP) ................................. 2012-045299

(51) Int. Cl.
*B60K 11/00* (2006.01)

(52) U.S. Cl.
USPC ...................................................... 180/68.1

(58) Field of Classification Search
USPC ......... 180/68.1–68.3, 69.2, 69.6; 296/193.11; 165/41, 44, 51
See application file for complete search history.

(56) References Cited

U.S. PATENT DOCUMENTS

| 4,454,926 | A | 6/1984 | Akins | |
|---|---|---|---|---|
| 7,537,072 | B2 * | 5/2009 | Sturmon et al. | 180/68.1 |
| 2003/0000752 | A1 * | 1/2003 | Hall et al. | 180/68.1 |

FOREIGN PATENT DOCUMENTS

JP   4-55527   2/1992

OTHER PUBLICATIONS

Extended Search Report issued Jun. 24, 2013 in European Patent Application No. 13157180.4.

* cited by examiner

*Primary Examiner* — John Walters
*Assistant Examiner* — James Triggs
(74) *Attorney, Agent, or Firm* — Oblon, Spivak, McClelland, Maier & Neustadt, L.L.P.

(57) ABSTRACT

A construction machine includes an engine disposed in an engine room, a heat exchanger disposed in the engine room, an air intake passage configured to provide a communication between the interior and the exterior of the engine room, and a cooling fan disposed in the engine room. The cooling fan is configured to draw external air into the engine room through the air intake passage by rotation thereof, and to flow the external air for allowing the external air to pass the heat exchanger. The heat exchanger has an air intake surface formed on a side portion thereof. The air intake surface is a surface configured to receive airflow to be drawn into the heat exchanger. The air intake passage is configured to flow the external air drawn to the air intake passage along a route passing a position over the heat exchanger and reaching the air intake surface.

13 Claims, 9 Drawing Sheets

CONSTRUCTION MACHINE

BACKGROUND OF THE INVENTION

1. Field of the Invention

The present invention relates to a construction machine provided with an air intake structure configured to draw an external air into an engine room and to guide the external air to a heat exchanger for cooling the heat exchanger.

2. Description of the Background Art

The background art is described taking an example of an excavator (shovel).

In an excavator, an engine room is disposed at a rear portion of an upper slewing body. An engine, a hydraulic pump, a cooling fan, and a heat exchanger such as a radiator and an oil cooler are disposed side by side in the engine room in the width direction of the upper slewing body. The excavator is constructed in such a manner that an air for cooling drawn from the exterior of the engine room and passed through the heat exchanger by rotation of the cooling fan.

In the conventional excavator, normally, an air intake port for drawing an external air into an engine room is formed in a side surface of the engine room in the width direction of the upper slewing body, or in a top surface of the engine room. In such a construction, intolerable degree of noise from the engine and in the vicinity of the engine, in other words, noise (hereinafter, generically called as "engine periphery noise") such as engine sound, pump sound, and fan sound may leak through the air intake port.

A technology has been proposed to solve the above drawback, as disclosed in Japanese Unexamined Patent Publication No. Hei 4-55527. The publication discloses a configuration that an air intake duct is formed into a curved shape extending from a front surface of a portion of a construction machine close to one widthwise end of the construction machine to an air intake surface of a heat exchanger. The forming the air intake duct into the curved shape increases the length of an air intake passage, whereby a noise reduction effect in the passage is enhanced. As a result, noise leakage through an air intake port is reduced.

In the above well-known technology, however, the entirety of the air intake duct is configured to have substantially the same height as the height of a main source of noise such as sounds of an engine and a cooling fan, and in such a state that engine periphery noise directly enters the duct. As a result, the absolute volume of engine periphery noise entering the air intake passage of the air intake duct increases. Further, in the above well-known technology, although the air intake duct is curved along the slewing direction of the upper slewing body, the air intake duct is not provided with a largely bent portion capable of blocking propagation of noise, which is believed to provide an enhanced noise reduction effect. Consequently, the noise reduction effect in the air intake duct is lowered. In view of these drawbacks, engine periphery noise which may leak to the exterior through the air intake port of the air intake duct increases. Thus, the noise reduction effect is low in the above well-known technology.

SUMMARY OF THE INVENTION

An object of the invention is to provide a construction machine that enables to reduce engine periphery noise entering an air intake passage, and to enhance a noise reduction effect in the air intake passage for enhancing a noise reduction effect of the construction machine.

A construction machine according to an aspect of the invention is provided with an engine room; an engine disposed in the engine room; a heat exchanger disposed in the engine room; an air intake passage configured to provide a communication between an interior and an exterior of the engine room; and a cooling fan disposed in the engine room, the cooling fan being configured to draw an external air into the engine room through the air intake passage by rotation of the cooling fan, and to flow the external air in such a manner that the external air passes through the heat exchanger. In the above configuration, the heat exchanger has an air intake surface formed on a side portion of the heat exchanger, the air intake surface being a surface configured to receive an airflow to be drawn into the heat exchanger. The air intake passage is configured to flow the external air drawn to the air intake passage along a route passing a position over the heat exchanger and reaching the air intake surface.

These and other objects, features and advantages of the present invention will become more apparent upon reading the following detailed description along with the accompanying drawings.

DETAILED DESCRIPTION OF THE EMBODIMENTS OF THE INVENTION

An excavator (shovel) as an example of a construction machine is applied to each of the following embodiments.

First Embodiment

See FIGS. 1 Through 4

Figure 1:
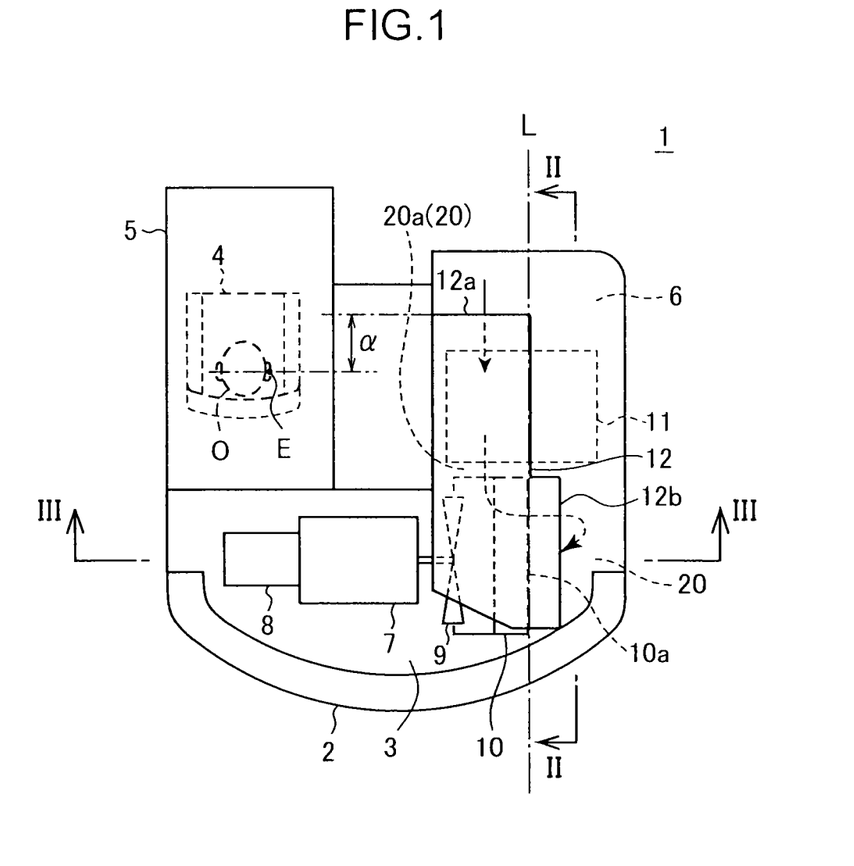
FIG. 1 is a partially sectional plan view showing a first embodiment of the invention.

An excavator is provided with a crawler-type lower propelling body (not shown), and an upper slewing body 1 loaded on the lower propelling body to be slewable. A working attachment (not shown) is attached to the upper slewing body 1.

An engine room 3 is disposed at a rear portion of the upper slewing body 1. The engine room 3 is formed by a counterweight 2 configured to cover the rear side of the engine room 3, and a cover member 14 configured to cover the front side, the left and right sides, and the top side of the engine room 3. A cabin 5 provided with a driver's seat 4 is disposed on a front left side of the engine room 3. Further, an equipment space (equipment chamber) 6 is disposed on a front right side of the engine room 3.

An engine 7, a hydraulic pump 8, a cooling fan 9, and a heat exchanger 10 are disposed side by side in the engine room 3 in left and right directions (transverse direction) of the excavator orthogonal to front and rear directions (longitudinal direction) of the excavator.

Specifically, the engine 7 is disposed substantially in the middle of the engine room 3 in the transverse direction (width direction of the excavator). The hydraulic pump 8 is disposed on the left side of the engine 7 in the engine room 3. The cooling fan 9 is disposed on the right side of the engine 7 in the engine room 3. The hydraulic pump 8 and the cooling fan 9 are driven by the engine 7.

Further, the heat exchanger 10 is disposed further on the right side of the cooling fan 9 in the engine room 3, in other words, at an outermost position in the engine room 3 in the width direction of the excavator. Specifically, the heat exchanger 10 is disposed at a rightmost position in the engine room 3 among the engine 7, the hydraulic pump 8, the cooling fan 9, and the heat exchanger 10. The heat exchanger 10 is constituted of a radiator, an oil cooler and an inter cooler etc. for cooling the engine 7. In the drawings, the devices constituting the heat exchanger 10 are illustrated as a heat exchanger 10 as a whole. The cooling fan 9 is configured to draw an air outside of the engine room 3 into the engine room 3 through an air intake passage 20 to be described later by rotation of the cooling fan 9, and to flow the drawn external air in such a manner that the drawn external air passes through the heat exchanger 10. Specifically, by rotation of the cooling fan 9, the external air is drawn into the engine room 3 through the air intake passage 20 to be described later and flows to an air intake surface 10a of the heat exchanger 10. The air intake surface 10a of the heat exchanger 10 is the right surface of the heat exchanger 10 in FIG. 1, and is a surface configured to receive an airflow to be drawn to the heat exchanger 10. The air intake surface 10a is also called as a core surface.

The terms "left" and "right" described in the specification correspond to left and right when viewed from an operator O (see FIG. 1 and FIG. 2) seated in the driver's seat 4, and the terms "front" and "rear" described in the specification correspond to front and rear when viewed from the operator O seated in the driver's seat 4.

On the other hand, various pieces of equipment such as a working oil tank 11 and a control valve (not shown) are housed in the equipment space 6.

The excavator according to the first embodiment is provided with the air intake passage 20 configured to provide a communication between the interior and the exterior of the engine room 3, on the basis of the aforementioned configuration. The air intake passage 20 is configured to flow an external air drawn to the air intake passage 20 along a route passing a position over the heat exchanger 10 and reaching the air intake surface 10a of the heat exchanger 10. Specifically, the air intake passage 20 extends along a route which extends from a position over the heat exchanger 10 to a side to which the air intake surface 10a of the heat exchanger 10 faces in the engine room 3, is bent downwardly, and reaches the air intake surface 10a. The air intake passage 20 has an upper passage portion 20a extending from the exterior of the engine room 3 to the interior of the engine room 3, and passing a position over the heat exchanger 10. The entirety of the upper passage portion 20a is disposed at a position higher than the position of the heat exchanger 10. The excavator according to the first embodiment is provided with an air intake duct 12 having an inner space for forming the upper passage portion 20a of the air intake passage 20. The air intake duct 12 is disposed in such a manner as to pass through an upper portion of the equipment space 6 and to extend in the longitudinal direction of the excavator. The air intake duct 12 and the upper passage portion 20a formed inside the air intake duct 12 are disposed along a route such that the external air drawn to the upper passage portion 20a passes a position over the heat exchanger 10, and is released toward the side to which the air intake surface 10a of the heat exchanger 10 faces in the engine room 3.

Specifically, the air intake duct 12 is constituted of a duct member 13, and a part of the cover member 14. As shown in e.g. FIG. 4, the duct member 13 has a substantially U-shape in section, with a top surface thereof being opened. The duct member 13 is a longitudinally elongated member. The cover member 14 is configured to cover the top surface and the side surfaces of the equipment space 6, and the top surface of the engine room 3. The cover member 14 has an upper wall configured to close the opening formed in the top surface of the duct member 13. The air intake duct 12 is constituted of the duct member 13 and the upper wall of the cover member 14. The air intake duct 12 is formed into a rectangular prismatic tube. The air intake duct 12 has a main air intake port 12a formed in a front end (a first end) of the air intake duct 12, and an air discharge port 12b formed in an end (a second end) of the air intake duct 12 opposite to the end where the main air intake port 12a is formed. The main air intake port 12a is a portion configured to draw the external air into the air intake duct 12, and the air discharge port 12b is a portion configured to release the external air that has passed through the air intake duct 12. The air discharge port 12b is opened rightwardly.

Alternatively, the air intake duct 12 may be formed into a rectangular prismatic tube, independently of the cover member 14, and the air intake duct 12 may be disposed below the upper wall of the cover member 14. Further alternatively, an independent air intake duct 12 may be disposed above the upper wall of the cover member 14.

In the first embodiment, the air intake duct 12 is disposed in a manner that meets the following requirements.

(A) The entirety of the air intake duct 12 is disposed at a position higher than the position of the heat exchanger 10.

(B) The center of the air intake duct 12 in a width direction thereof along the transverse direction is displaced inwardly (leftwardly) of the excavator in the width direction thereof along the transverse direction with respect to the center L of the equipment space 6 in a width direction thereof along the transverse direction. In other words, the right surface of the air intake duct 12 is located on the left side with respect to the right surface of the equipment space 6.

(C) The air intake duct 12 horizontally extends along the longitudinal direction from a position near the front end of the equipment space 6 to a position over the heat exchanger 10.

(D) The main air intake port 12a is disposed at a forward position with respect to a standard position E of the ears of the operator O seated in the driver's seat 4 in a front portion (front portion of the equipment space 6) of the excavator, and is opened toward the external space on the front side of the excavator. The symbol a shown in FIG. 1 and FIG. 2 indicates a forward displacement amount of the main air intake port 12a with respect to the standard position E of the ears of the operator O.

(E) A rear portion of the air intake duct 12 where the air discharge port 12b is formed is located above the heat exchanger 10, and the air discharge port 12b is opened toward a space S (indicated by the symbol S in FIG. 3, hereinafter, called as the air intake space S) to which the air intake surface 10a of the heat exchanger 10 faces in the engine room 3.

Figure 2:
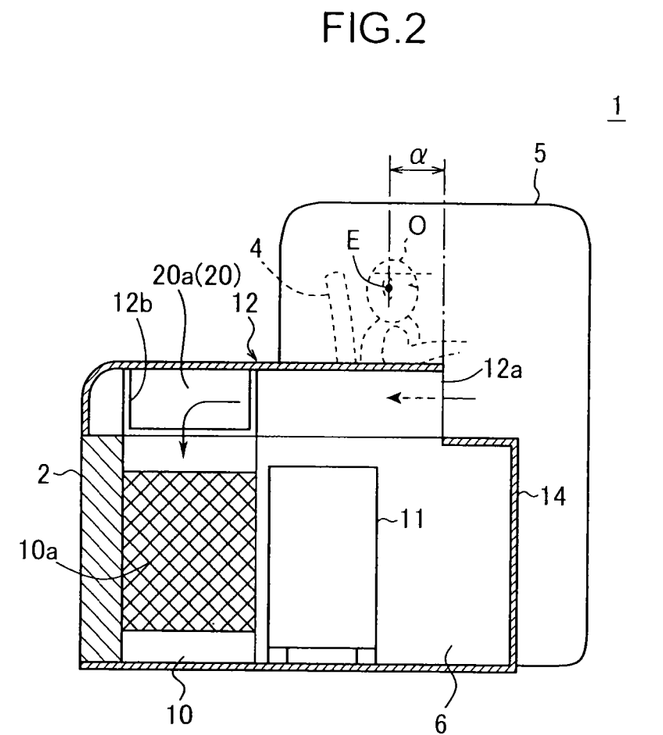
FIG. 2 is a cross-sectional view taken along the line II-II in FIG. 1.
Figure 3:
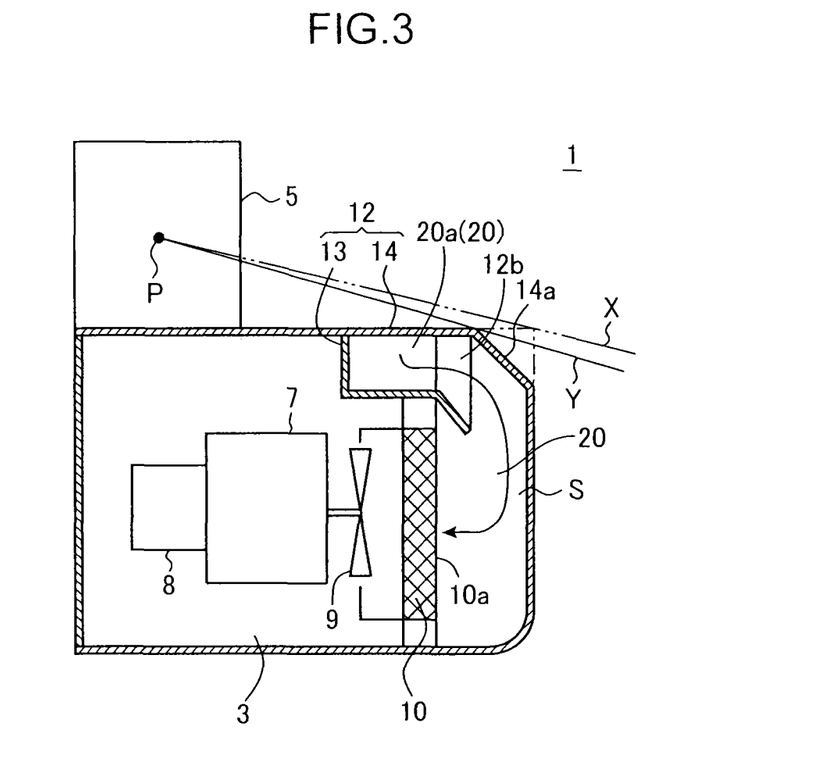
FIG. 3 is a cross-sectional view taken along the line III-III in FIG. 1.
Figure 4:
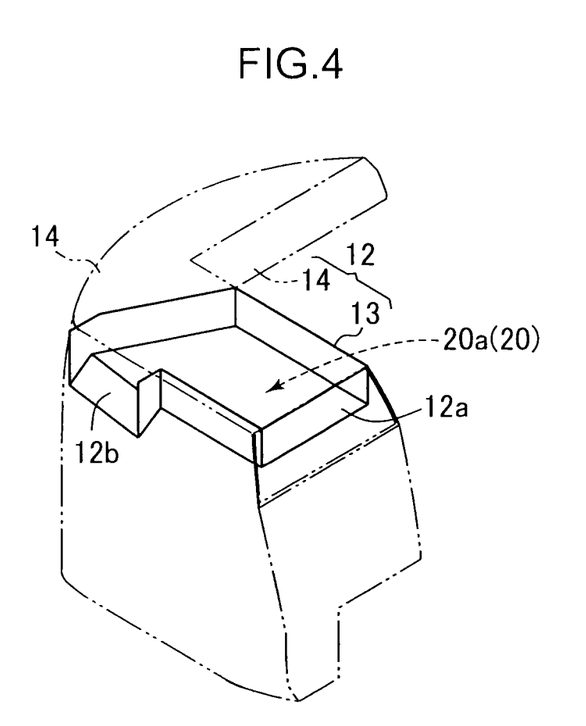
FIG. 4 is a perspective view of an air intake duct according to the first embodiment.

In the above configuration, in response to rotation of the cooling fan 9, an external air is drawn into the air intake duct 12 through the main air inlet port 12a as shown by the arrows in FIGS. 1 through 3, flows rearwardly, passes a position over the heat exchanger 10, and is released to the air intake space S through the air discharge port 12b of the air intake duct 12. Thereafter, the released airflow flows downwardly, is bent leftwardly, and then enters the heat exchanger 10 through the air intake surface 10a. The airflow that has entered the heat exchanger 10 passes through the heat exchanger 10 and flows leftwardly in the engine room 3, and is discharged through a discharge port (not shown). The heat exchanger 10 is cooled by the aforementioned stream of airflow.

In the first embodiment, a route in which the external air flows is formed in such a manner that after the external air passes a position over the heat exchanger 10, the external air enters the heat exchanger 10 through the air intake surface 10a while flowing downwardly and making a U-turn. Therefore, in the case where engine periphery noise is directed toward the air intake duct 12 along the route in a direction opposite to the flow direction of the external air, after exiting the air intake surface 10a of the heat exchanger 10, the noise reaches the air intake duct 12 along a bent route directing upwardly and bent at an angle of 180°. Accordingly, it is possible to obtain an enhanced noise reduction effect by the bent route.

More specifically, engine periphery noise travels horizontally through the heat exchanger 10 and enters the air intake space S through the air intake surface 10a due to a property that sound propagates. Then, the engine periphery noise impinges on a wall covering the air intake space S, specifically, a right side wall of the cover member 14, and reflects thereon. A part of the sound reflected on the wall returns to the engine room 3, another part of the sound repeats reflections in the air intake space S, and only the sound reflected obliquely leftwardly and upwardly, as a part of the remainder of the sound, enters the air intake duct 12 through the air discharge port 12b. In this way, the volume of noise entering the upper passage portion 20a in the air intake duct 12 is reduced.

Further, the upper passage portion 20a in the air intake duct 12 extends leftwardly from the air discharge port 12b, and is bent forwardly at an angle of 90°. Accordingly, the noise entering the air intake duct 12 through the air discharge port 12b is reflected in the air intake duct 12, and only the noise reflected forwardly out of the reflected noise is directed toward the main air intake port 12a while undergoing further reflection and attenuation in the air intake duct 12.

As described above, in the first embodiment, the maze-like air intake passage 20 which blocks entering and propagation of noise is configured. Thus, the first embodiment is advantageous in remarkably reducing engine periphery noise which may leak to the exterior through the main air intake port 12a, as compared with a conventional art.

It is desirable to mount a sound absorbing member made of e.g. glass wool on the inner surface of the air intake duct 12 for further enhancing the noise reduction effect in the air intake duct 12.

In addition to the above basic effects, the first embodiment provides the following effects.

(i) The entirety of the upper passage portion 20a occupying a major region of the air intake passage 20 can be disposed at a position higher than the position of the heat exchanger 10. Accordingly, it is possible to form the upper passage portion 20a in a space, in which there exists no equipment as obstacles against formation of the upper passage portion 20a, and capable of relatively freely determining the route and the length of the upper passage portion 20a. Thus, it is possible to secure a sufficiently long length for the air intake passage 20, and to obtain an enhanced noise reduction effect.

(ii) The upper passage portion 20a of the air intake passage 20 is formed by providing the air intake duct 12. Accordingly, it is possible to form easily the upper passage portion 20a of the air intake passage 20, while obtaining the effect (i).

(iii) It is possible to use a space over the equipment space 6 which is originally disposed on the front right side of the engine room 3, as an installation space for the air intake duct 12. Accordingly, it is possible to form the longitudinally long air intake duct 12.

(iv) It is possible to form the air intake duct 12 into a substantially linear shape on the right side where the heat exchanger 10 is disposed. Accordingly, it is possible to simplify the configuration of the air intake duct 12 and to install easily the air intake duct 12.

(v) The air intake duct 12 is disposed in such a state that the widthwise center of the air intake duct 12 is displaced toward the widthwise center of the excavator with respect to the widthwise center L of the equipment space 6. Further, the main air intake port 12a as an exit of engine periphery noise is opened toward the exterior at an inner position with respect to the outermost end of the upper slewing body 1. Accordingly, it is possible to alleviate an influence of noise on workers working in the vicinity of the excavator.

(vi) In the first embodiment, in the excavator constructed in such a manner that the driver's seat 4 is disposed on the side opposite to the side where the equipment space 6 is formed in the transverse direction, and the equipment space 6 is surrounded by the cover member 14, the air intake duct 12 is disposed in such a state that the widthwise center of the air intake duct 12 is displaced widthwise inwardly of the upper slewing body 1 with respect to the widthwise center L of the equipment space 6. Accordingly, as shown in FIG. 3, a vacant space is formed at a position close to a widthwise outer end of the excavator in the upper portion of the equipment space 6. Accordingly, it is possible to form a right-side upper corner portion 14a, corresponding to the vacant space, of the cover member 14 for forming the equipment space 6 into an inclined outer surface (upper surface) which is inclined downwardly toward the widthwise outer end (right side) of the excavator.

Referring to FIG. 3, the symbol P indicates a position of a standard eye point of an operator in the cabin 5, the symbol X indicates a lower limit line of the right side view when viewed from the eye point P, in the case where the upper corner portion 14a of the cover member 14 is formed at a right angle, without an inclination, and the symbol Y indicates a lower limit line of the right side view when viewed from the eye point P, in the case where the upper corner portion 14a is inclined as described in the first embodiment. As is clear from FIG. 3, the configuration of the first embodiment is advantageous in securing a side view from the driver's seat 4 in a satisfactory manner, regardless of installation of the air intake duct 12.

(vii) The main air intake port 12a is opened toward the front side of the excavator at a forward position with respect to the standard position E of the ears of the operator O seated in the driver's seat 4. Accordingly, it is possible to suppress engine periphery noise exiting through the main air intake port 12a from directly entering the ears of the operator O. Thus, it is possible to reduce the noise which may enter the ears of the operator O.

Further, the fact that the main air intake port 12a is opened toward the front side of the excavator at a forward position with respect to the position E of the ears of the operator O means that a sufficiently long length can be secured for the air intake duct 12. This is advantageous in enhancing the noise reduction effect by the air intake duct 12.

In the first embodiment, as shown in FIG. 1 and FIG. 3, the rear portion of the air intake duct 12 is disposed in such a state that the rear portion of the air intake duct 12 covers the cooling fan 9 at a position over the cooling fan 9. Accordingly, there is formed a double-cover structure such that the region over the cooling fan 9 is covered by the rear end of the duct member 13 constituting the air intake duct 12 and by the upper wall of the cover member 14. Thus, it is possible to suppress driving sound and spinning sound derived from the cooling fan 9 from leaking upwardly to the exterior of the engine room 3. As a result, it is possible to obtain an effect of suppressing leakage of driving sound and spinning sound of the cooling fan 9 to the exterior of the engine room 3.

Second Embodiment

Figure 5:
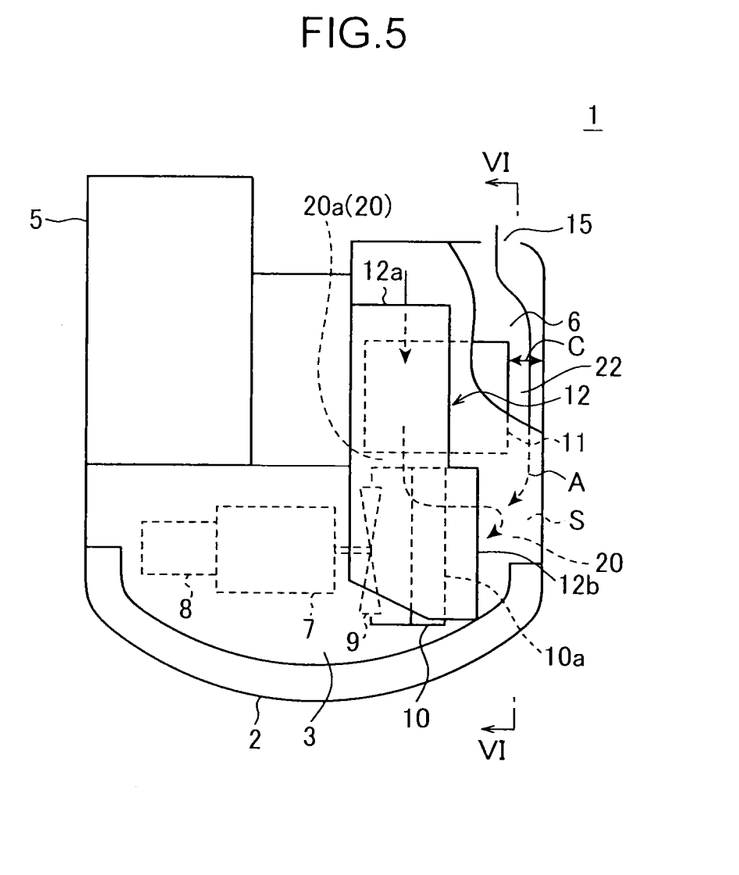
FIG. 5 is a partially sectional plan view showing a second embodiment of the invention.
Figure 6:
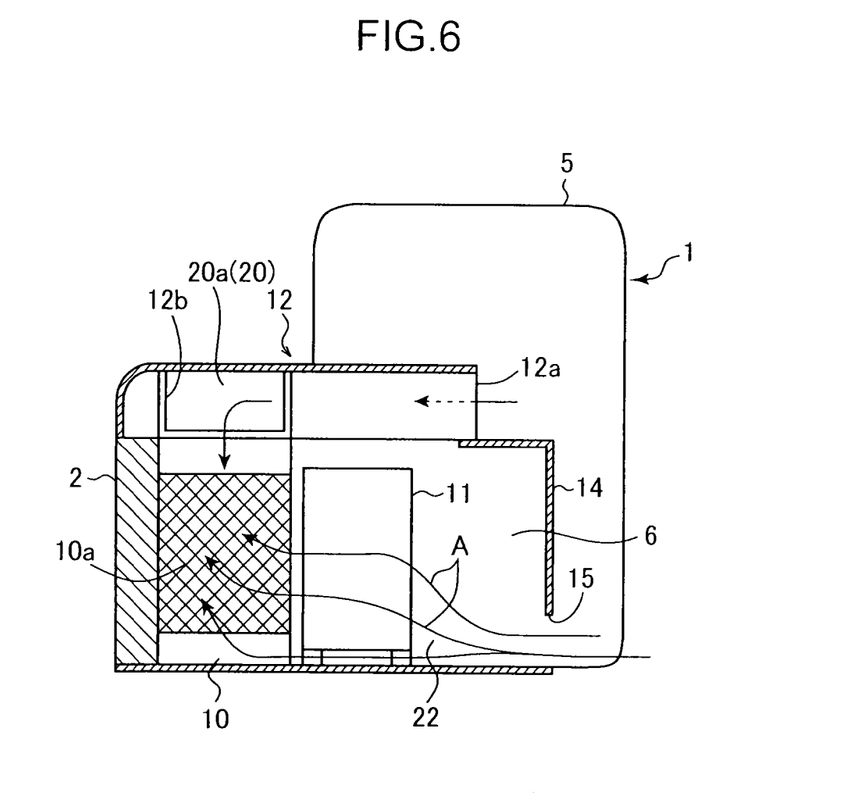
FIG. 6 is a cross-sectional view taken along the line VI-VI in FIG. 5.

See FIG. 5 and FIG. 6

In the following second through fourth embodiments, merely the differences between the first embodiment and the second through fourth embodiments are described.

It is a common practice to configure an excavator in such a manner that an equipment space 6 is formed by covering a region over an upper frame as a base block of an upper slewing body 1 by a cover member 14, and as shown in FIG. 5, various pieces of equipment such as a working oil tank 11 are disposed in the equipment space 6, with a clearance C being formed with respect to an inner surface of the cover member 14. In other words, the interior of the equipment space 6 is originally air-communicable by provision of the clearance C.

In view of the above, in the second embodiment, an auxiliary air intake port 15, as an opening for communicating between the interior and the exterior of a cover member 14, is formed in a front wall of the cover member 14 for forming an equipment space 6. In other words, the auxiliary air intake port 15 is configured to provide a communication between the exterior space of the cover member 14 and the equipment space 6. As shown by the arrows A in FIG. 5 and FIG. 6, an auxiliary air passage 22 is configured to flow an external air in such a manner that the external air drawn into the equipment space 6 through the auxiliary air intake port 15 flows parallel to an airflow in the air intake duct 12 and enters an air intake space S through the equipment space 6.

The auxiliary air intake port 15 may be formed in a lower portion of a front wall of the cover member 14 as shown in FIG. 6, or may be formed in an upper portion of the front wall or in a vertically intermediate portion of the front wall.

In the above configuration of the second embodiment, it is possible to increase the volume of external air to be drawn from the air intake space S into the heat exchanger 10. Thus, it is possible to enhance the cooling effect of the heat exchanger 10.

Third Embodiment

Figure 7:
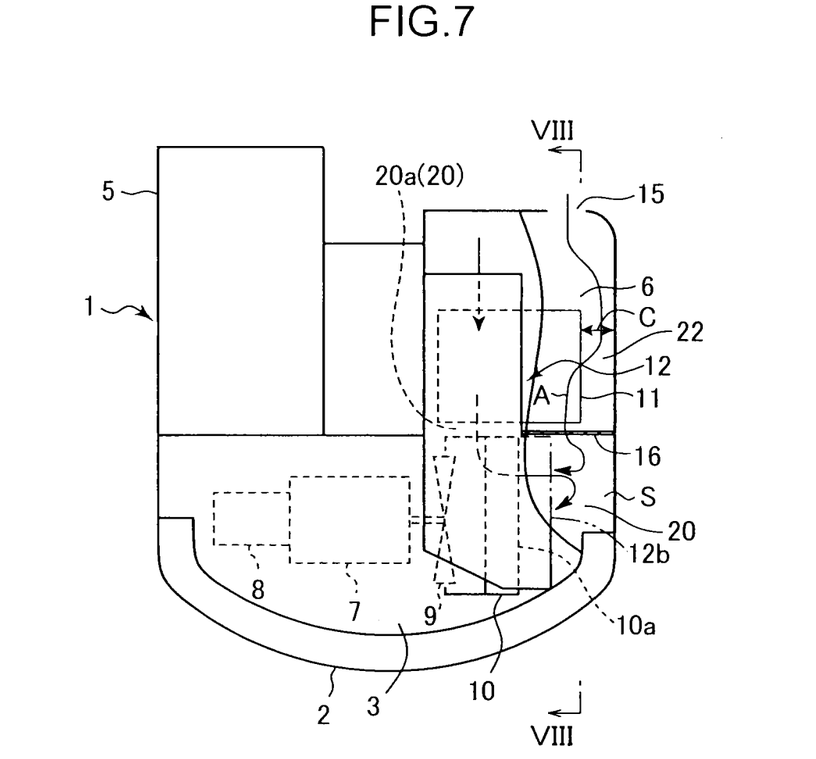
FIG. 7 is a partially sectional plan view showing a third embodiment of the invention.
Figure 8:
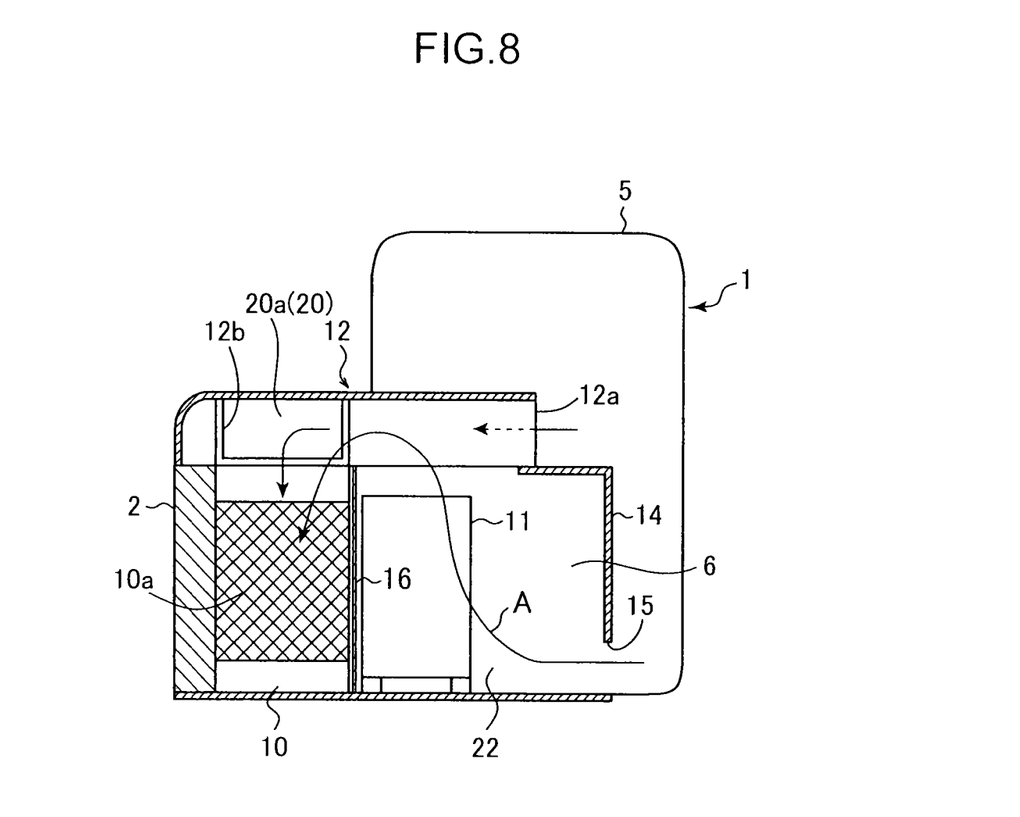
FIG. 8 is a cross-sectional view taken along the line VIII-VIII in FIG. 7.

See FIG. 7 and FIG. 8

In the configuration of the second embodiment, the airflow passing through the upper passage portion 20a in the air intake duct 12 and the airflow passing through the auxiliary air passage 22 merge in the air intake space S, while approaching and impinging each other in a vertical direction. As a result, a disturbance of the airflow is generated in the merging region, whereby the airflow resistance may increase.

In view of the above, in the third embodiment, a guide plate 16 is disposed near a front end of an air intake space S, based on the configuration of the second embodiment. The guide plate 16 is configured to guide an airflow passing through an auxiliary air passage 22 to a position higher than a position of a heat exchanger 10 and merge the airflow with an external air passing through an air intake passage 20.

In the above configuration, the airflow passing through the auxiliary air passage 22 is guided to a position higher than the position of the heat exchanger 10 by the guide plate 16, and detours the guide plate 16 while passing substantially at the same height position as the height position of the airflow passing through the upper passage portion 20a in the air intake duct 12. Then, the airflow passing through the auxiliary air passage 22 merges with the airflow passing through the upper passage portion 20a while flowing downwardly substantially in the same manner as the airflow passing through the upper passage portion 20a. Thus, it is possible to reduce the airflow resistance in the merging region of airflows. This contributes to an increase in the volume of airflow.

Fourth Embodiment

Figure 9:
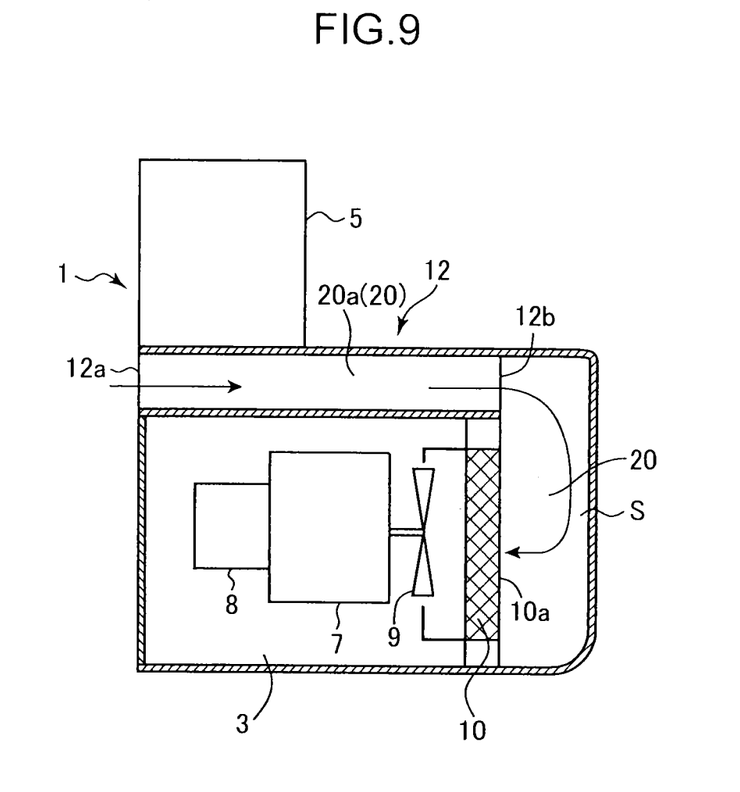
FIG. 9 is a rear sectional view showing a fourth embodiment of the invention.

See FIG. 9

In the fourth embodiment, in a construction machine configured to secure a space continuously extending in a transverse direction at an upper portion of an engine room 3, an air intake duct 12 is formed to extend in the transverse direction while passing through the upper portion of the engine room 3 which is located at a higher position than a heat exchanger 10. Further, a main air intake port 12a is formed in a left end of the air intake duct 12, and an air discharge port 12b is formed in a right end of the air intake duct 12. Further, the air intake duct 12 is configured in such a manner that an airflow exiting through the air discharge port 12b via the air intake duct 12 enters the heat exchanger 10 through an air intake surface 10a, after making a U-turn downwardly in an air intake space S.

In the configuration of the fourth embodiment, it is basically possible to obtain substantially the same noise reduction effect as in a configuration that the air intake duct 12 extends in a longitudinal direction of the construction machine.

Other Embodiments (1) The invention is applicable to an excavator configured in such a manner that a heat exchanger 10 is provided on a left portion in an engine room 3.

In the above modification, as described in the fourth embodiment referring to e.g. FIG. 9, an air intake duct 12 may be disposed to extend in a transverse direction in an upper portion of an engine room 3, a main air intake port 12a may be formed in a right end of the air intake duct 12, and an air discharge port 12b may be formed in a left end of the air intake duct 12.

(2) As far as a construction machine is configured to secure a space continuously extending longitudinally or transversely at a position higher than the position of a heat exchanger 10 in an equipment space 6 or in an engine room 3, it is possible to form an air intake passage by mounting plate members or a frame member of a U-shape in section on a lower surface of an upper wall of an existing cover member.

(3) The invention is not limited to an excavator configured in such a manner that a driver's seat 4 is disposed in a cabin 5, but is also applicable to an excavator such as a compact excavator configured in such a manner that a driver's seat is exposed to the exterior. Further, the invention is also widely applicable to various construction machines other than excavators. Specifically, the invention is applicable to a construction machine configured in such a manner that an engine, a heat exchanger, and a cooling fan are disposed in an engine room, and that an external air is drawn into the engine room and passed through the heat exchanger by rotation of the cooling fan substantially in the same manner as in an excavator.

Summary of the Embodiments

The following is a summary of the embodiments.

A construction machine according to the embodiments includes an engine room; an engine disposed in the engine room; a heat exchanger disposed in the engine room; an air intake passage configured to provide a communication between an interior and an exterior of the engine room; and a cooling fan disposed in the engine room. The cooling fan is configured to draw an external air into the engine room through the air intake passage by rotation of the cooling fan, and to flow the external air in such a manner that the external air passes through the heat exchanger. In the above configuration, the heat exchanger has an air intake surface formed on a side portion of the heat exchanger, the air intake surface being a surface configured to receive an airflow to be drawn into the heat exchanger. The air intake passage is configured to flow the external air drawn to the air intake passage along a route passing a position over the heat exchanger and reaching the air intake surface.

In the above configuration, the external air flows in such a manner that the external air passes a position over the heat exchanger through the air intake passage, is bent downwardly, and enters the air intake surface of the heat exchanger. On the other hand, engine periphery noise passes through the air intake passage in a direction opposite to the direction of the flow of the external air. Specifically, engine periphery noise is released to the exterior of the engine room through the air intake passage extending from the air intake surface of the heat exchanger and bent upwardly. Accordingly, it is possible to enhance the noise reduction effect of engine periphery noise by a bent route which extends from the air intake surface of the heat exchanger and is bent toward the air intake passage, while making a U-turn. Thus, as compared with a conventional well-known art, the above configuration is advantageous in reducing the volume of noise which may leak to the exterior.

In the construction machine, preferably, the air intake passage may have an upper passage portion configured to extend from the exterior of the engine room to the interior of the engine room, and to pass the position over the heat exchanger, an entirety of the upper passage portion being disposed at a position higher than a position of the heat exchanger.

In the above configuration, it is possible to form the upper passage portion occupying a major region of the air intake passage, in a space at a higher position than the heat exchanger, where there exists no equipment as obstacles against formation of an air intake passage, and capable of relatively freely determining the route and the length of the air intake passage. Thus, it is possible to secure a sufficiently long length for the air intake passage, and to obtain an enhanced noise reduction effect due to the formation of the air intake passage.

Preferably, the construction machine may further include an air intake duct having an inner space for forming the upper passage portion, wherein the air intake duct has a main air inlet port in a first end thereof, and an air discharge port in a second end thereof, the second end being opposite to the first end, the main air inlet port is disposed outside the engine room, and the air discharge port is opened toward a space to which the air intake surface of the heat exchanger faces in the engine room.

In the above configuration, it is possible to easily form the upper passage portion of the air intake passage by the air intake duct. In particular, in the case where the entirety of the air intake duct is formed in a space at a higher position than the heat exchanger, where there exists no obstacle against installation of the air intake duct, the installation of the air intake duct is more simplified. Further, the above configuration is advantageous in reducing the volume of engine periphery sound entering the upper passage portion in the air intake duct through the air discharge port. Thus, the above configuration is more advantageous in reducing the volume of noise which may leak to the exterior.

Preferably, the construction machine provided with the air intake duct may further include an equipment space disposed forward of the engine room and on one of sides of the construction machine in a transverse direction thereof orthogonal to a longitudinal direction thereof, the equipment space being configured to house pieces of equipment including a working oil tank. In the above configuration the main air inlet port is opened toward a front side of the construction machine, and the air intake duct extends in the longitudinal direction of the construction machine, while passing through an upper portion of the equipment space.

In the above configuration, in a construction machine configured in such a manner that an equipment space is disposed forward of the engine room and on one of the sides of the construction machine in a transverse direction thereof, it is possible to secure the upper portion of the equipment space as the installation space for the air intake duct. This is advantageous in forming an air intake duct having a sufficiently long length in a longitudinal direction of the construction machine.

In the above configuration, preferably, the engine, the heat exchanger, and the cooling fan may be disposed side by side in the engine room in the transverse direction, the heat exchanger being disposed at a rightmost position or at a leftmost position among the engine, the heat exchanger, and the cooling fan, and the equipment space and the air intake duct may be disposed on a same side as the heat exchanger in the transverse direction.

In the above configuration, it is possible to form the air intake duct substantially into a linear shape on the same side as the heat exchanger in the transverse direction. This is advantageous in simplifying the configuration of the air intake duct and installation of the air intake duct.

In the construction machine configured in such a manner that the air intake duct extends in the longitudinal direction of the construction machine while passing through the upper portion of the equipment space, preferably, the air intake duct may be disposed in such a state that a center of the air intake duct in a width direction thereof along the transverse direction is displaced inwardly of the construction machine in a width direction thereof along the transverse direction with respect to a center of the equipment space in a width direction thereof along the transverse direction.

In the above configuration, the air intake duct is disposed at a position close to the center of the construction machine away from a transverse outer end of the construction machine which is disposed at a side where the air intake duct is located. Accordingly, the main air inlet port of the air intake duct, as an exit of engine periphery noise, is also disposed at a position away from the outer end of the construction machine. The above configuration is advantageous in alleviating an influence of noise on workers working in the vicinity of the construction machine.

Preferably, the construction machine having the above configuration may further include a driver's seat disposed forward of the engine room and on the side opposite to the side where the equipment space is disposed in the transverse direction; and a cover member configured to surround the equipment space for forming the equipment space. In the above configuration, the cover member has an upper corner portion disposed at a position close to a widthwise outer end of the construction machine, and at an upper portion of the cover member, and the upper corner portion has an inclined outer surface configured to incline downwardly toward the widthwise outer end of the construction machine.

In a construction machine configured in such a manner that a driver's seat is disposed on the side opposite to the side where the equipment space is disposed in the transverse direction of the construction machine, and the equipment space is configured to be surrounded by the cover member, in the case where the air intake duct is disposed widthwise inwardly of the construction machine as described above, there is formed a vacant space in a portion close to the widthwise outer end of the construction machine in the upper portion of the equipment space. In view of the above, if an upper corner portion, corresponding to the vacant space, of the cover member is configured to have an inclined outer surface which is inclined downwardly toward the widthwise outer end of the construction machine, as described in the above configuration, the above configuration is advantageous in securing a side view from the driver's seat in a satisfactory manner, regardless of installation of the air intake duct.

Preferably, the construction machine configured in such a manner that the main air inlet port is opened toward a front side of the construction machine may further include a driver's seat disposed forward of the engine room and on the side opposite to the side where the equipment space is disposed in the transverse direction, and the main air inlet port is disposed at a forward position with respect to a standard position of the ears of an operator seated in the driver's seat.

In the above configuration, it is possible to suppress engine periphery noise exiting through the main air inlet port from directly entering the ears of the operator. Accordingly, it is possible to reduce noise which may enter the ears of the operator. Further, the fact that the air intake port is opened toward the front side of the construction machine at a forward position with respect to the position of the ears of the operator means that a sufficiently long length can be secured for the air intake duct. This is advantageous in enhancing the noise reduction effect by the air intake duct.

In the case of an excavator, it is a common practice to configure the excavator in such a manner that an equipment space is formed by enclosing a region above an upper frame as a base block of an upper slewing body by a cover member, and pieces of equipment such as a working oil tank are disposed in the equipment space, with a clearance being formed with respect to an inner surface of the cover member. In other words, the interior of the equipment space is originally air-communicable by provision of the clearance.

In view of the above, preferably, the construction machine provided with the equipment space may further include a cover member configured to surround the equipment space for forming the equipment space, wherein the cover member is formed with an auxiliary air inlet port, and an auxiliary air passage is formed in an inside of the cover member, the auxiliary air passage being configured to flow an external air drawn into the inside of the cover member through the auxiliary air passage port to a space to which the air intake surface of the heat exchanger faces in the engine room via a space outside of the air intake duct in the equipment space.

In the above configuration, it is possible to increase the volume of external air to be drawn to the heat exchanger. Therefore, the above configuration is advantageous in enhancing the cooling effect of the heat exchanger.

In the above configuration, in the case where an airflow passing through the air intake passage and an airflow passing through the auxiliary air passage merge in different directions from each other in a space to which the air intake surface of the heat exchanger faces, the airflow resistance may increase due to a disturbance of the airflows in the merging region.

In view of the above, preferably, the construction machine having the above configuration may further include a guide plate configured to guide an airflow flowing through the auxiliary air passage to a position higher than a position of the heat exchanger so as to merge with an external airflow flowing through the air intake passage.

In the above configuration, it is possible to reduce the airflow resistance in the merging region where the airflow passing through the air intake passage and the airflow passing through the auxiliary air passage merge each other. This contributes to an increase in the volume of airflow.

On the other hand, in the construction machine provided with the air intake duct, preferably, the engine, the heat exchanger, and the cooling fan may be disposed side by side in the engine room in a transverse direction of the construction machine orthogonal to a longitudinal direction of the construction machine, the heat exchanger being disposed at a rightmost position or at a leftmost position among the engine, the heat exchanger, and the cooling fan, the main air inlet port may be disposed on a side opposite to the side where the heat exchanger is disposed in the transverse direction, and opened toward the exterior of the engine room, and the air intake duct may extend in the transverse direction, while passing through an upper portion of the engine room.

The above configuration is a configuration that an air intake duct extends in the transverse direction while passing through the upper portion of the engine room, in the case where the construction machine is configured to secure a space continuing in the transverse direction in the upper portion of the engine room.

Even in the above configuration, it is basically possible to obtain substantially the same noise reduction effect as in the case where an air intake duct is configured to extend in the longitudinal direction of the construction machine.

In the construction including the driver's seat, preferably, the main air inlet port may be disposed at a forward position with respect to a standard position of the ears of an operator seated in the driver's seat.

In the construction machine including the cover member, preferably, the cover member may be formed with an auxiliary air inlet port, and an auxiliary air passage may be formed in an inside of the cover member, the auxiliary air passage being configured to flow an external air drawn into the inside of the cover member through the auxiliary air passage port to a space to which the air intake surface of the heat exchanger faces in the engine room via a space outside of the air intake duct in the equipment space.

As described above, according to the embodiments, it is possible to reduce engine periphery noise itself entering the air intake passage, and to enhance a noise reduction effect in the air intake passage, thereby enhancing a noise reduction effect of the construction machine.

This application is based on Japanese Patent Application No. 2012-045299 filed on Mar. 1, 2012, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A construction machine, comprising:
an engine room;
an engine disposed in the engine room;
a heat exchanger disposed in the engine room;
an air intake passage configured to provide a communication between an interior and an exterior of the engine room; and
a cooling fan disposed in the engine room, the cooling fan being configured to draw an external air into the engine room through the air intake passage by rotation of the cooling fan, and to flow the external air in such a manner that the external air passes through the heat exchanger, wherein
the heat exchanger has an air intake surface formed on a side portion of the heat exchanger, the air intake surface being a surface configured to receive an airflow to be drawn into the heat exchanger, and
the air intake passage is configured to flow the external air drawn to the air intake passage along a route passing a first position just above the heat exchanger and bending downward at a second position downstream of the first position, to reach the air intake surface.

2. The construction machine according to claim 1, wherein the air intake passage has an upper passage portion configured to extend from the exterior of the engine room to the interior of the engine room, and to pass the first position just above the heat exchanger, an entirety of the upper passage portion being disposed at a position higher than a position of the heat exchanger.

3. The construction machine according to claim 1, further comprising an air intake duct having an inner space for forming an upper passage portion of the air intake passage, the upper passage portion being configured to extend from the exterior of the engine room to the interior of the engine room, and to pass the first position just above the heat exchanger, wherein
the air intake duct has a main air inlet port in a first end thereof, and an air discharge port in a second end thereof, the second end being opposite to the first end,
the main air inlet port is disposed outside the engine room, and
the air discharge port is opened toward a space to which the air intake surface of the heat exchanger faces in the engine room.

4. A construction machine, comprising:
an engine room;
an engine disposed in the engine room;
a heat exchanger disposed in the engine room;
an air intake passage configured to provide a communication between an interior and an exterior of the engine room;
a cooling fan disposed in the engine room, the cooling fan being configured to draw an external air into the engine room through the air intake passage by rotation of the cooling fan, and to flow the external air in such a manner that the external air passes through the heat exchanger, wherein
the heat exchanger has an air intake surface formed on a side portion of the heat exchanger, the air intake surface being a surface configured to receive an airflow to be drawn into the heat exchanger, and
the air intake passage is configured to flow the external air drawn to the air intake passage along a route passing a position over the heat exchanger and reaching the air intake surface;
an air intake duct having an inner space for forming an upper passage portion of the air intake passage, the upper passage portion being configured to extend from the exterior of the engine room to the interior of the engine room, and to pass the position over the heat exchanger; and
an equipment space disposed forward of the engine room and on one of sides of the construction machine in a transverse direction thereof orthogonal to a longitudinal direction thereof, the equipment space being configured to house pieces of equipment including a working oil tank, wherein
the air intake duct has a main air inlet port in a first end thereof, and an air discharge port in a second end thereof, the second end being opposite to the first end,
the main air inlet port is disposed outside the engine room,
the air discharge port is opened toward a space to which the air intake surface of the heat exchanger faces in the engine room,
the main air inlet port is opened toward a front side of the construction machine, and
the air intake duct extends in the longitudinal direction of the construction machine, while passing through an upper portion of the equipment space.

5. The construction machine according to claim 4, wherein the engine, the heat exchanger, and the cooling fan are disposed side by side in the engine room in the transverse direction, the heat exchanger being disposed at a rightmost position or at a leftmost position among the engine, the heat exchanger, and the cooling fan, and
the equipment space and the air intake duct are disposed on a same side as the heat exchanger in the transverse direction.

6. The construction machine according to claim 4, wherein the air intake duct is disposed in such a state that a center of the air intake duct in a width direction thereof along the transverse direction is displaced inwardly of the construction machine in a width direction thereof along the transverse direction with respect to a center of the equipment space in a width direction thereof along the transverse direction.

7. The construction machine according to claim 6, further comprising:
a driver's seat disposed forward of the engine room and on the side opposite to the side where the equipment space is disposed in the transverse direction; and
a cover member configured to surround the equipment space for forming the equipment space, wherein
the cover member has an upper corner portion disposed at a position close to a widthwise outer end of the construction machine, and at an upper portion of the cover member, and
the upper corner portion has an inclined outer surface configured to incline downwardly toward the widthwise outer end of the construction machine.

8. The construction machine according to claim 4, further comprising a driver's seat disposed forward of the engine room and on the side opposite to the side where the equipment space is disposed in the transverse direction, wherein
the main air inlet port is disposed at a forward position with respect to a standard position of the ears of an operator seated in the driver's seat.

9. The construction machine according to claim 4, further comprising
 a cover member configured to surround the equipment space for forming the equipment space, wherein
 the cover member is formed with an auxiliary air inlet port, and
 an auxiliary air passage is formed in an inside of the cover member, the auxiliary air passage being configured to flow an external air drawn into the inside of the cover member through the auxiliary air passage port to a space to which the air intake surface of the heat exchanger faces in the engine room via a space outside of the air intake duct in the equipment space.

10. The construction machine according to claim 9, further comprising a guide plate configured to guide an airflow flowing through the auxiliary air passage to a position higher than a position of the heat exchanger so as to merge with an external airflow flowing through the air intake passage.

11. A construction machine, comprising:
 an engine room;
 an engine disposed in the engine room;
 a heat exchanger disposed in the engine room;
 an air intake passage configured to provide a communication between an interior and an exterior of the engine room;
 a cooling fan disposed in the engine room, the cooling fan being configured to draw an external air into the engine room through the air intake passage by rotation of the cooling fan, and to flow the external air in such a manner that the external air passes through the heat exchanger, wherein
 the heat exchanger has an air intake surface formed on a side portion of the heat exchanger, the air intake surface being a surface configured to receive an airflow to be drawn into the heat exchanger, and
 the air intake passage is configured to flow the external air drawn to the air intake passage alone a route passing a position over the heat exchanger and reaching the air intake surface; and
 an air intake duct having an inner space for forming an upper passage portion of the air intake passage, the upper passage portion being configured to extend from the exterior of the engine room to the interior of the engine room, and to pass the position over the heat exchanger, wherein
 the air intake duct has a main air inlet port in a first end thereof, and an air discharge port in a second end thereof, the second end being opposite to the first end,
 the main air inlet port is disposed outside the engine room, and
 the air discharge port is opened toward a space to which the air intake surface of the heat exchanger faces in the engine room, wherein
 the engine, the heat exchanger, and the cooling fan are disposed side by side in the engine room in a transverse direction of the construction machine orthogonal to a longitudinal direction of the construction machine, the heat exchanger being disposed at a rightmost position or at a leftmost position among the engine, the heat exchanger, and the cooling fan,
 the main air inlet port is disposed on a side opposite to the side where the heat exchanger is disposed in the transverse direction, and opened toward the exterior of the engine room, and
 the air intake duct extends in the transverse direction, while passing through an upper portion of the engine room.

12. The construction machine according to claim 7, wherein
 the main air inlet port is disposed at a forward position with respect to a standard position of the ears of an operator seated in the driver's seat.

13. The construction machine according to claim 7, wherein
 the cover member is formed with an auxiliary air inlet port, and
 an auxiliary air passage is formed in an inside of the cover member, the auxiliary air passage being configured to flow an external air drawn into the inside of the cover member through the auxiliary air passage port to a space to which the air intake surface of the heat exchanger faces in the engine room via a space outside of the air intake duct in the equipment space.

\* \* \* \* \*